United States Patent
Shipman, Jr.

(10) Patent No.: US 12,469,095 B1
(45) Date of Patent: Nov. 11, 2025

(54) TRACKING AND ALERTING OF DISPENSING OF ITEMS

(71) Applicant: Tech Friends, Inc., Jonesboro, AR (US)

(72) Inventor: Bobby L. Shipman, Jr., Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 71 days.

(21) Appl. No.: 18/171,615

(22) Filed: Feb. 20, 2023

Related U.S. Application Data

(63) Continuation-in-part of application No. 18/089,095, filed on Dec. 27, 2022, now Pat. No. 12,254,523, and a continuation-in-part of application No. 16/681,322, filed on Nov. 12, 2019, now Pat. No. 11,587,086, said application No. 18/089,095 is a continuation-in-part of application No. 16/364,099, filed on Mar. 25, 2019, now Pat. No. 11,538,125, which is a continuation-in-part of application No. 15/860,637, filed on Jan. 2, 2018, now Pat. No. 10,242,417, which is a continuation of application No. 15/252,695, filed on Aug. 31, 2016, now Pat. No. 9,858,632.

(51) Int. Cl.
  *G06Q 50/26* (2024.01)
  *G06Q 10/1091* (2023.01)
  *G07C 9/37* (2020.01)

(52) U.S. Cl.
  CPC ......... *G06Q 50/26* (2013.01); *G06Q 10/1091* (2013.01); *G07C 9/37* (2020.01)

(58) Field of Classification Search
  CPC ..................................................... G06Q 50/26
  See application file for complete search history.

(56) References Cited

U.S. PATENT DOCUMENTS

| | | | | |
|---|---|---|---|---|
| 7,455,223 B1* | 11/2008 | Wilson | ................... | G06Q 20/18 222/2 |
| 7,493,190 B1* | 2/2009 | Tomassi | ................... | G07F 7/125 221/9 |
| 2005/0240305 A1* | 10/2005 | Bogash | ................... | G16H 20/13 700/242 |
| 2008/0058985 A1* | 3/2008 | Alcov | ....................... | G07F 7/00 700/234 |
| 2008/0070631 A1* | 3/2008 | Kumar | ................ | H04M 1/7243 455/558 |

(Continued)

*Primary Examiner* — Davetta W Goins
*Assistant Examiner* — Pameshanand Mahase
(74) *Attorney, Agent, or Firm* — Schrantz Law Firm, PLLC; Stephen D. Schrantz

(57) ABSTRACT

The vending machine system employs at least one biometric capture device or configured to capture biometrics of a person accessing the vending machine. The system monitors the vending machine to track usage and attempted usage of the vending machine. The system creates records and logs of usage and attempted usage of the vending machine. The system also generates alerts concerning usage and attempted usage of the vending machine. The records, logs, and alerts identify information concerning the usage and attempted usage of the vending machine, including the identity of the user, an image of the user/person, the location, and information concerning the transaction, such as the item to be dispensed.

7 Claims, 9 Drawing Sheets

(56) References Cited

U.S. PATENT DOCUMENTS

| | | | |
|---|---|---|---|
| 2011/0295417 A1* | 12/2011 | Smith, III | G07F 9/002 700/235 |
| 2013/0314210 A1* | 11/2013 | Schoner | G06Q 10/06 340/8.1 |
| 2016/0155127 A1* | 6/2016 | Hartman | H04N 5/772 705/18 |
| 2016/0200463 A1* | 7/2016 | Hodges | G07F 13/06 53/136.3 |

* cited by examiner

TRACKING AND ALERTING OF DISPENSING OF ITEMS

CROSS-REFERENCE TO RELATED APPLICATIONS

This application claims priority to and is a continuation in part of U.S. patent application Ser. No. 16/681,322 entitled "RULE BASED VENDING MACHINE SYSTEM" that was filed on Nov. 12, 2019 which is hereby incorporated by reference.

This application also claims priority to and is a continuation in part of U.S. patent application Ser. No. 18/089,095 entitled "AUTOMATED DELIVERY TRACKING USING BIOMETRIC IDENTIFICATION" that was filed on Dec. 27, 2022 that is a continuation in part of U.S. patent application Ser. No. 16/364,099 entitled "AUTOMATED EVENT DETECTION IN CONTROLLED-ENVIRONMENT AREAS USING BIOMETRIC IDENTIFICATION" that was filed on Mar. 25, 2019 that issued as U.S. Pat. No. 11,538,125 on Dec. 27, 2022 which is a continuation in part of U.S. patent application Ser. No. 15/860,637 entitled "Automated Resident Check-ins in controlled-environment Areas Using Biometric identification" that was filed on Jan. 2, 2018 that issued as U.S. Pat. No. 10,242,417 on Mar. 26, 2019 which is a continuation of U.S. patent application Ser. No. 15/252,695 entitled "Automated Resident Check-ins in controlled-environment Areas Using Biometric identification" that was filed on Aug. 31, 2016 that issued as U.S. Pat. No. 9,858,632 on Jan. 2, 2018 which are hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates generally to a payment distribution system and method. The present invention distributes money to local users after identifying the payee. The present invention also allows a local user to distribute or otherwise transfer money to third parties. The payee may choose to receive the payment or reroute the payment to a third party. The present invention also relates to distribution systems for controlled-environment facilities, including prisons and jails. The present invention also relates to a system for automating the distribution of payment instruments, including, but not limited to, money, credit, financial instruments, and other payment instruments to users via a vending machine.

II. Description of the Known Art

Certain problems exist with the known art. Using card payment methods such as debit cards, credit cards, or gift cards has become an extremely popular way to make payments in lieu of cash. However, the card payment method has traditionally required human interaction or long processing times due to mail delivery. The present invention provides an automated method that dispenses and activates debit, credit, gift card, or other token-based payment instruments.

Often inmates being released from jail receive a debit card preloaded with any unspent funds from their incarceration time. An officer typically performs the task of providing the debit card. The officer retrieves a debit card from a stocked inventory of inactive debit cards, loads the card with the inmate's unspent balance, activates the debit card for use, and distributes the debit card and the documentation, such as terms and conditions, to the inmate. This process consumes a substantial amount of an officer's time who also has important security duties which can often interrupt the procedure. Providing the debit card limits the other duties that the officer could be performing.

Involving an officer also creates a dangerous situation in a controlled environment facility. Such danger increases when an officer's attention is directed to distributing a debit card instead of monitoring inmate behavior that could lead to physical harm.

Inactive debit card stock can also be used to commit fraud. An unscrupulous officer or jail staff member could fraudulently transfer an inmate's funds onto a debit card for personal gain instead of properly distributing the funds to the inmate. To avoid the fraudulent transfers, access to inactive debit cards is secured, tracked, and audited on a regular basis.

Terms and conditions of payment instruments like debit cards must be distributed with the payment instrument as legally required. In secured environments such as jails, the staff may be untrained and unaware of such a legal requirement. Such lack of training could potentially result in the distribution of the debit card to the inmate without proper documentation.

The known art requires human involvement for distribution of the funds. Such human involvement requires the payee to wait for a user and allows opportunities for fraud and mistakes. Bank tellers often distribute debit cards to customers for replacements or personalization. In these cases, the person receiving the debit card must wait in line to see a person and then wait as the various steps of stock retrieval, activation, and distribution are performed manually.

Convenience store employees often activate gift cards for customers. Many stores today provide displays of gift cards available for many vendors. A customer typically selects a gift card and gives the card to the store employee with a payment method, including but not limited to cash or credit. The store employee must verify identity, process the payment method, and activate the card with the appropriate amount. Such a process potentially leads to issues that could arise due to poor training or an understaffed workforce that could cause problems.

If the identity verification process is skipped by the store employee, money laundering can be performed which could leave the store liable for losses and legal action. Improper activation of the card may upset the customer. Financial losses can occur if the payment method is not counted and entered properly. Large scale fraud can occur if unscrupulous employees are given access to the system. Individual gift cards can also be removed from displays and lost prior to activation, resulting in missed sales opportunities.

In money laundering activities, criminals commonly attempt small transactions spread across a large number of locations in order to hide the actual volume of transaction amounts. With individual employees, such laundering is difficult to combat and requires coordinated activity across an organization. The present invention provides a networkable solution which automates the process of verifying total transaction volume across a network of automated distribution systems in communication to reduce such money laundering.

Therefore, the present invention is needed to provide a unique vending machine that automates the distribution of funds while applying rules for dispensing the funds. Such a vending machine applies the rules to limit fraud, theft, unlawful actions, and other mistakes when distributing funds. The present invention also provides a vending machine for dispersion of funds to third parties.

SUMMARY OF THE INVENTION

The present invention relates to a vending machine that automates the distribution of funds to a user, the payee. A vending machine of the present invention applies rules for distributing funds to the payee. The system identifies the payee and the payee's funds. The system applies rules to determine the funds available to the payee. The system may pay all funds owed to the payee. The system may also apply rules that limit the amount that can be distributed to the user.

The system may also allow the payee to select the type of payment instrument received from the vending machine of the present invention. The user selects a credit card, debit card, gift card, cash, etc. The system applies rules to determine the payment instrument available to the user. The system then delivers the allowed payment instrument to the payee in the amount approved by the system.

The system then distributes the payment instrument to the payee via the vending machine. The computing system of one embodiment applies the rules for the vending system. The computing system authorizes the loading of the payment instrument with funds. The computing system and/or the vending machine can activate and load the payment instruments with the requested funds.

If required, the vending machine also activates the payment instrument for use by the payee. In some embodiments, legal documentation or other information must be delivered to the payee. The vending machine may supply an electronic or hard copy version of the documentation and/or information to the payee. The vending machine confirms that the user received the documentation. The system of one embodiment verifies receipt of the documentation. The system may require a user to enter an input indicating that the user received the documentation. The system may also deliver documentation and require the user to scan or take a picture of a bar code or other identifier indicating that the user received the documentation.

The computing system and/or the vending machine activates and/or loads the payment instruments with the requested funds after confirmation of receipt of the payment instrument by the payee. The computing system and/or the vending machine of one embodiment activates and/or loads the payment instruments with the requested funds after confirmation of the payee receiving the documentation, such as terms and conditions. The computing system and/or the vending machine of one embodiment activates and/or loads the payment instruments with the requested funds after confirmation of the payee agreeing to the terms and conditions of the payment instrument.

The system also enables a user to redistribute the payee's funds to third parties. The system requests the user to select a particular action. Such actions may include, but are not limited to, requesting funds for the payee, purchasing goods and/or services, and transferring funds to a third party. The user may pay for goods and/or services. The user may also pay existing debts for prior purchases. The user may also transfer money to third parties. Such transfers may cover existing fines, debts, or other payments that the payee may want to make from the available funds.

The system may also track the funds associated with the payment instrument dispensed. The system determines any unused funds of the payee. The system may allow the user to cancel the prior payment instrument having the unused funds. The system then adds the unused funds to the current payment instrument or returns the funds to the user's account. The system applies rules to determine if the user should be given the option to cancel the prior payment instrument and reclaim the funds that were previously disbursed. The system may also charge a fee for cancelling the prior payment instrument.

A person, including but not limited to an inmate, approaches a vending machine type system. The inmate provides identity information to the unit. The unit may give the inmate information about current balance, previous transactions, and/or payment distribution options. The system evaluates the person's identity and historic activity to determine the available options for the user. For example, the system may limit the number of distributions to a single inmate over a period of time. Conversely, if the inmate was previously issued a payment instrument, such as a debit card, but never activated the card properly, the vending machine may dispense a new payment instrument to the user.

The system may also implement a rule that limits the transaction amounts over a time period. The system may also require the inmate to receive multiple payment instruments if a single payment instrument cannot process the entire refund amount.

Another rule may require an inmate to authorize or sign other documents before receiving released funds. Another rule requires the user to agree to the terms and conditions of the payment instrument prior to activating the instrument.

All activity will be logged for alerts and general reporting. Captured images, such as pictures or video, could be taken for future verification of identity. Biometrics could also identify the user, such as the payee, the distributee, the receiving party, and the customer. The logging tracks and reports the dispensing/delivery of an item, including, but not limited to, a dispensed item, a distributed item, a vended item, an item purchased for the user, and a payment instrument. The logged records may include the identity of the user, the item dispensed, a captured image of the user, the date and time, and the location at which the item is dispensed, and the Vending Machine ID from which the item was dispensed to the user.

The system may also create an alert, including but not limited to an electronic message, an alarm, a text message, email, or other message that indicates delivery of the item or attempted access to the item. Such alerts may indicate that a particular user has accessed the machine, has been dispensed an item, or the dispensing system refuses to dispense an item to a user.

Once the person's identity is verified and choices are presented, the person may select to be vended a payment instrument like a debit card. The debit card would typically be packaged with the documentation are presented together, for example, a package that couples both a plastic card and documentation, for receipt by the user. The system may also present the inmate with terms and conditions electronically that requires confirmation of the agreement before authorizing the vending operation. If electronic confirmations are required, the system electronically records the inmate's acceptance of the agreement as proof of delivery.

After the payment instrument is vended to the inmate, the payment instrument must be associated with the inmate and activated. The system of one embodiment automatically activates the payment instrument and associates the instrument with the payee by tracking which payment instrument is vended to the inmate. In another embodiment, the system could require the inmate to call an interactive voice response system and enter information about the payment instrument and possibly identity verification information.

In another embodiment, the system requires scanning a barcode on the payment instrument on a barcode reader on or off the vending machine for verification. Another embodiment may require the user to swipe the debit card through a magnetic stripe reader or entry of an identifier of the payment instrument on or off the vending machine. Such identification of the payment instrument could be done by an app on a mobile device, either with manual entry, using the camera, or other mobile device entry methods.

Based on the activation information, the system will identify the inmate and payment instrument associated with the transaction. If the inmate is allowed to perform the transaction, the vending machine activates the payment instrument. The system allocates any funds involved in the transaction to the payment instrument. The payment instrument will then be "live" and ready for use.

The system also provides a resolution if a payment instrument is damaged or lost. The inmate may be given the option through the system to void a previously distributed payment instrument and receive another instrument. When voiding a previously distributed instrument, the system verifies the identity of the payee. The balance of the payment instrument may be checked against rules for the transaction. Other rules may be enforced such as number of voids within a certain time period. If the system authorizes the transaction, the original payment instrument will be voided and rendered unusable for future transactions. The system vends a new payment instrument activated with the unused funds from the voided payment instrument. Another embodiment may return the unused funds to the user's account. In some embodiments, they system may apply a transaction fee applied to the transaction.

In some embodiments, a communication system will be integrated with the distribution system which could allow technical support to inmates.

In some embodiments, the distribution system may also be used as a standard vending machine. In these embodiments, the distribution system may vend food or other items in the same vending machine as payment instruments are distributed.

In some embodiments, the distribution system may allow cash or credit card deposits to be taken and applied to an account for the benefit of an incarcerated individual.

In some embodiments, the distribution system may allow purchasing of phone time to communicate with inmates.

In some embodiments, the distribution system may allow purchasing of video visitation time to communicate with inmates.

In some embodiments, the distribution system may allow purchasing of email credit for communication with inmates.

In some embodiments, the distribution system may allow cash or credit card payments to be made for existing debts the user might have or for other transactions the person might want to perform such as paying fines or licensing fees.

In some embodiments, the distribution system would have an integrated or connected printing device which could print checks for distribution to inmates. In some embodiments, the distribution system would have an integrated or connected printing device for receipts. In some embodiments, the distribution system would have an integrated or connected printing device for printing terms and conditions for payment instruments.

In some embodiments, the distribution system would enable video or audio communication with incarcerated individuals. In these embodiments, the distribution system might have an integrated telephone handset, camera, microphone, or other communication accessories.

In some embodiments, the distribution system would enable other non-financial transactions. For example, registering for inmate visitation appointments, requesting facility assistance, getting general facility information, watching training videos, and the like.

In some embodiments, the distribution system would alert support staff if a malfunction were detected.

In some embodiments, the inventory of payment instruments is tracked. Reports and alerts can be generated based on the inventory of the payment instruments.

In some embodiments, the distribution system consists of multiple vending units connected by a central server.

In some embodiments, rules would preclude distribution of a payment instrument while inmate is incarcerated.

In some embodiments, the distribution system would include voice prompts to provide information to the user.

In some embodiments, the inmate may initiate a payment to an outside party. In this case, the inmate would provide information about the outside party which might include name, address, phone number, relationship, or the like. The inmate would provide an amount to be disbursed to the outside party. The inmate would provide an identity verification method for the outside party, for example a password which would be required for the outside person to obtain the payment. The outside party would use the distribution system to identify themselves and enter the identity verification password. If identity is matched and rules allow the transaction, the debit card would be vended to the outside party. The outside party would then use the distribution system to activate the debit card with the amount specified by the inmate.

In some embodiments, multiple payment instruments may be vended from the same machine. Rules can be established to determine which, if any, payment instruments are available for distribution to an identified individual.

In some embodiments, the distribution system acts as a remote payment or money transmission system. For example, a parent could send their child money from a remote location by using the internet to authorize the distribution of a payment instrument and amount. The child, potentially located in a different city or country, could receive a vended payment instrument and activate it to receive the funds sent from the parent. Unlike some money transmission technologies, this would require no smart phone or human involvement to receive the payment.

In some embodiments, the distribution system would track total distributions to an individual or payments from an individual and restrict distributions which would exceed a set dollar amount over a period. In some embodiments, the distribution system would identify potentially suspicious transactions and alert for potential money laundering or fraudulent activities.

In some embodiments, charity distributions for homeless or hunger relief programs could be made through the automated distribution system. A number of vending systems could be distributed in an area with a high homeless population which contain both food vending items and payment instruments. The homeless person could register an identity and receive defined benefits from the charity organization through any of the vending machines connected to the network. A centralized server would verify the identity and authorize the vending of food and payment instruments based on the person's history. Limits could be established to prevent abuse. Reporting could be provided to the charity agency to verify distributions and identify patterns of need. These systems could strongly prevent abuse, reach people in the areas that distribution centers are not present, eliminate long lines, and remove the stigma from receiving identified charity distributions.

It is an object of the present invention to dispense funds to payees via a vending machine. It is another object of the present invention to automate the process of distributing payment instruments to a payee.

It is another object of the present invention to apply rules when distributing funds to a payee.

It is another object of the present invention to provide the payee with options for distributing the funds to the payee.

It is another object of the present invention to track funds on a distributed payment instrument.

It is another object of the present invention to allow voiding a previously distributed payment instrument to recover the funds of the voided payment instrument.

It is another object of the present invention to allow users options for the method of receiving funds.

It is another object of the present invention to enable the user to purchase goods and/or services.

It is another object of the present invention to enable the user to pay existing debts and/or fines.

It is another object of the present invention to enable the user to transfer funds to a third party.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
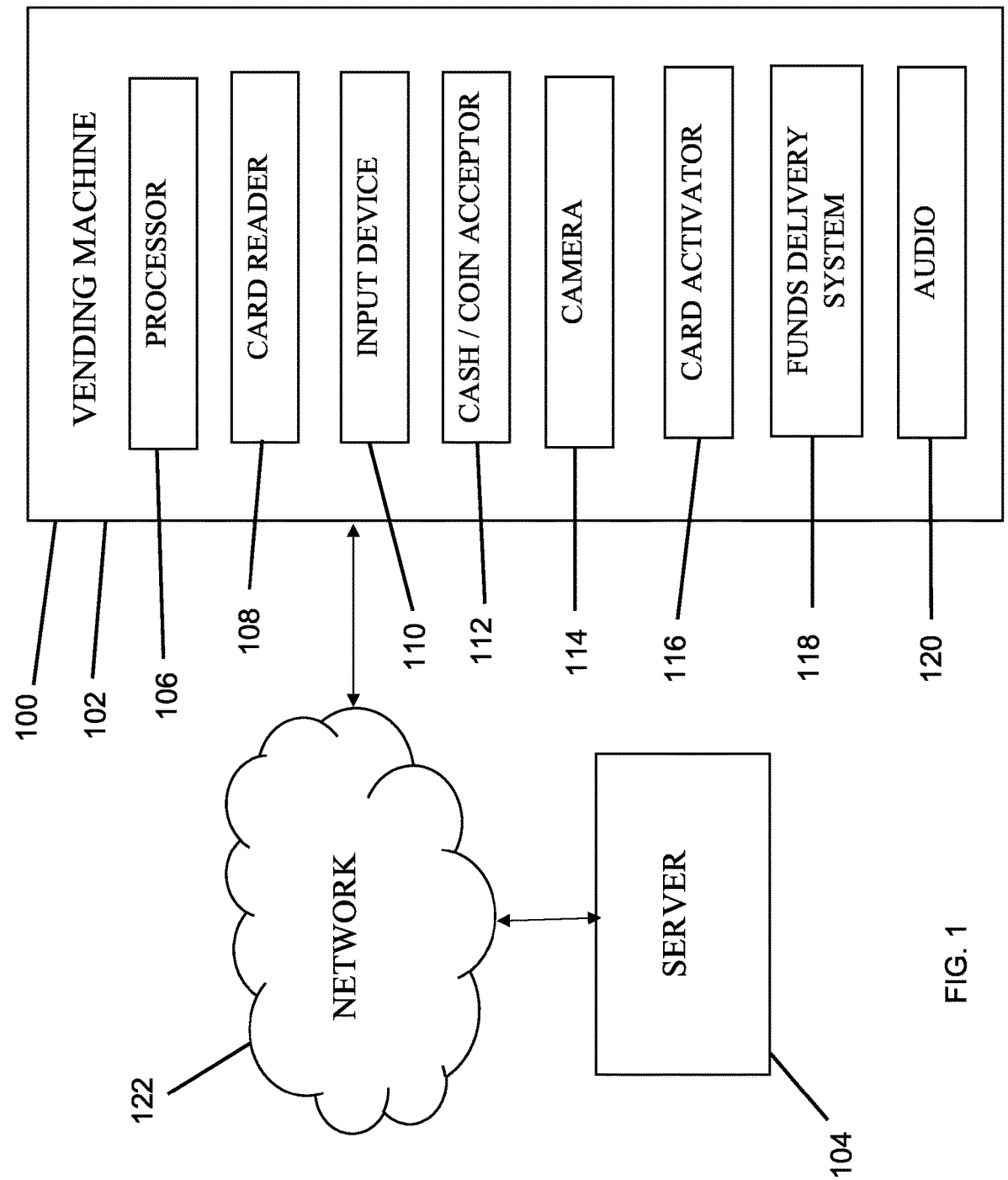
FIG. 1 is a schematic view of one embodiment of the present invention.
Figure 2:
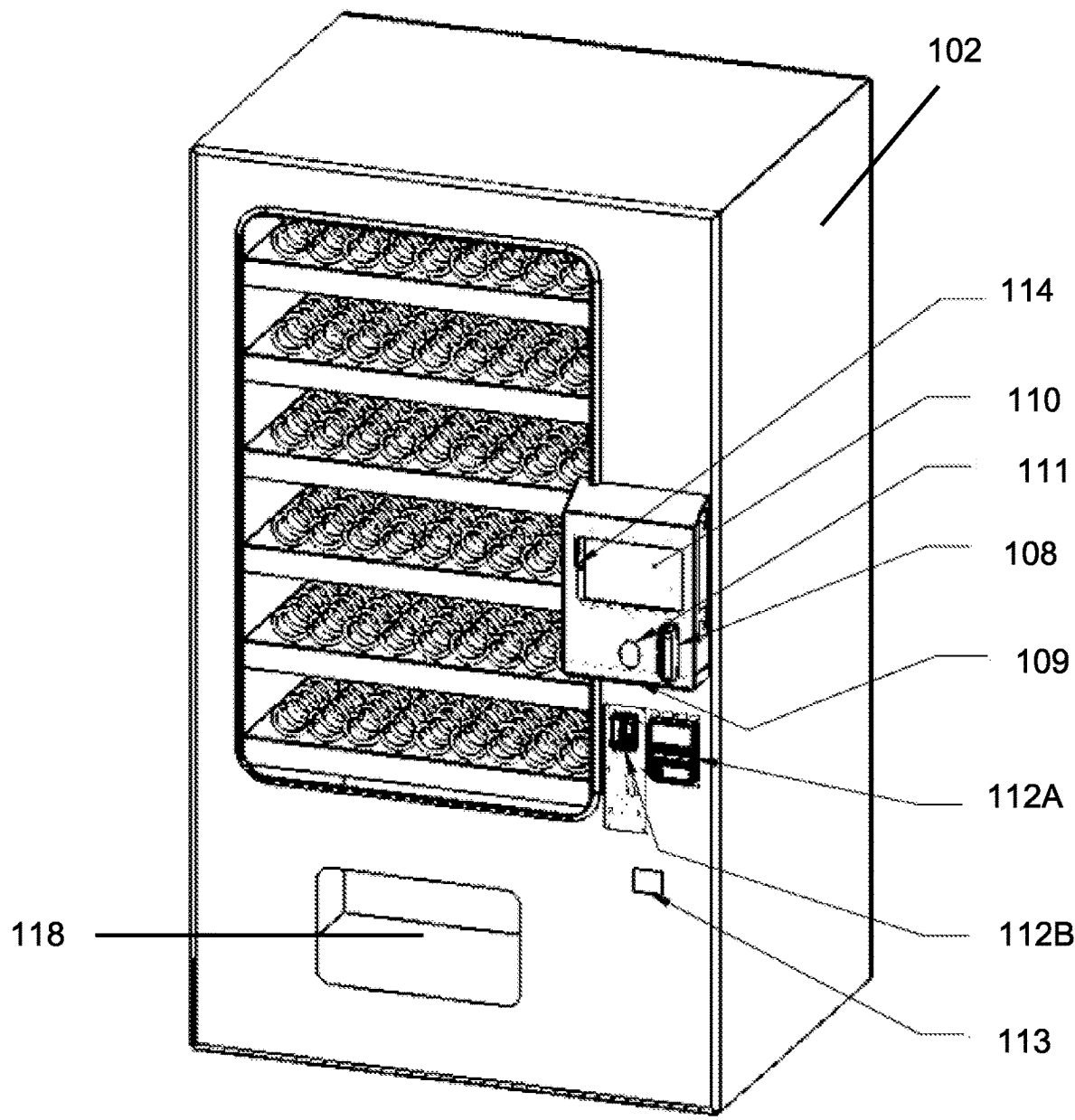
FIG. 2 is a perspective view showing one embodiment of the present invention.

A vending machine system 100, such as a vending machine, as shown in FIGS. 1 and 2, automates the distribution of funds to a user, such as a payee. The vending machine system 100 applies rules for distributing funds to the payee. The system 100 identifies the payee and the payee's funds. The system 100 applies rules to determine the funds available to the payee. The system 100 may pay all funds owed to the payee. The system may also apply rules that limit the amount that can be distributed to the user.

FIG. 1 shows the vending machine system generally shown as 100. The vending machine system 100 provides networked vending machines 102 that communicate with a server 104 over a network 122. The system 100 can include one or more vending machines 102 connected to a server 104. The server 104 of one embodiment tracks users, the user's account, the user's purchases, the identity information, the balances of the accounts, and the account information. In one embodiment, the vending machine 102 queries the server 104, such as a central server, for determining whether to authorize a transaction. The vending machine 102 can also implement the rules without a server to authorize a transaction.

The rules can be applied to a specific vending machine or groups of vending machines. Rules can be set to apply to a user, such as a specific inmate, or a set of users, such as a set of inmates. These rules may be applied to a set of users, such as a set of inmates, identified by location, geographic location, housing location, classification, inmate classification, age, gender, safety rating, indigent status, purchase history, account balance, account debt or other criteria.

The system 100 stores the stored identification data locally and/or remotely. In one embodiment, the vending system 100 stores the stored identification data on a server 104. The vending machines 102 communicate with the server 104 wirelessly or through a wired connection.

Identification of the user and application of the rules for the user's transactions may be applied on a computing system locally on vending machine 102, remotely on server 104, or both locally on the vending machine 102 and server 104. In one embodiment, a computing system is installed with the vending machine for completing the transactions. A computing system may communicate with the vending machine using a multi-drop bus (MDB) interface, USB, Bluetooth, WIFI, Ethernet, electrical signals, acoustic signals, visual signals, other standard computer or vending machine communication interfaces, or the like. The computing system may identify the user, authenticate the user, apply the rules, and bill the user.

When performed locally, the computing system performs all of the tasks associated with purchasing and dispensing the item. The computing system applies the rules and identifies the purchase price of the item.

When performed on server 104, the computing system may be installed with the vending machine 102. The computing system may perform at least one of the tasks required for the transaction(s). The server 104 may also perform the tasks of identifying the user, authenticating the user, and applying the rules. The server 104 instructs the operation of the vending machines 102. The server 104 instructs the vending machine 102 if the transaction should be allowed.

The system 100 identifies the user accessing the vending machine 102. An identification device 106, 110 associated with the vending machine 102 collects captured identification data to identify the user. The identification device 106, 110 identifies the user of the vending machine 102. The identification device 106, 110 captures identification data from the user at the time of using the vending machine 102. Such captured identification data may include, but not limited to, a password, authentication code, or biometric identification.

The identification device 106, 110 may be a keyboard, key pad, biometric, capture device, camera, microphone, fingerprint reader, RF capture device, a device for receiving of RF signals reflected from a person and/or absorbed by a person, or other biometric capture device or mechanism, or the like. The identification system captures the captured identification data.

The vending machine system identifies the user via stored identification data. The vending machine system compares the captured identification data with the stored identification to identify the user. Such a comparison may be performed by the server or by the vending machine. The system identifies a user based upon a match of the stored identification data with the captured identification data.

The camera, which may capture images and/or video, captures an image of the user, such as the distributee, customer, etc., at the vending machine. The computing system compares the captured image to the stored identification to authenticate the user in one embodiment. The vending system may also store the captured image for tracking, for a record, and to log events at people at the vending machine.

The system 100 is implemented on a vending machine 102, such as a kiosk. The vending machine 102 provides hardware for distributing the payment instrument to the user. The vending machine 102 includes, but is not limited to, a processor 106, a card reader 108, an input device 110 such as a microphone, keypad, keyboard, touchscreen, etc., a cash/coin acceptor 112, a camera 114, a card activator 116, a card delivery system 118, and an audio device 120. The processor 106 of the vending machine 102 enables the rules to be applied and processes the data between the vending machine 102 and the server 104.

The card reader 108 reads cards including but not limited to ID cards, driver's licenses, credit cards, debit cards, gift cards, etc. Multiple card readers 108 may be installed in the vending machine 102 to read the different types of cards. The card reader can identify the inserted cards. Such identification of the inserted card can activate the card, determine the balance of the card, initiate a transaction, identify the user, etc.

The input device 110 of the vending machine 102 accepts user input. Such an input device includes, but is not limited to, a keypad, a keyboard, a touchpad, a mouse, a touchscreen, a biometric input device, such as fingerprint reader 111, etc. The user enters the transaction data into the input device 110. Such transaction data may include, transaction amount, type of transaction, delivery method, etc. The user may also enter the user's identification to the input device 110 to identify the user.

The cash/coin acceptor 112, also shown as cash acceptor 112A and coin acceptor 112B, accepts cash and/or coins into the vending machine 102. The cash/coin acceptor 112 allows the user to use the added funds in the transaction. The vending machine 102 accounts for the inserted funds to be applied to the user and the user's transaction(s). The vending machine 102 also returns change through coin return 113.

The camera 114 of one embodiment captures an image of the user to identify the user. Authentication of the user's identity enables the vending machine 102 to complete a transaction. Authentication of the user enables the system to identify the user and the funds associated with the user. Authentication of the user also allows the system to disburse any payments, food items, incentives, or other items to be disbursed to the user.

The card activator 116 activates the card to be disbursed to the user. The card may be activated by reading card activation information, including but not limited to, a bar code or magnetic strip, reading the numbers and/or code of the card, inputting a PIN number, etc. The card activator enables usage of the payment instrument.

The funds delivery system 118 dispenses a payment instrument to the payee. The funds delivery system 118 delivers the payment instrument approved by the system. The funds delivery system 118 may deliver payment instruments, including but not limited to, cash, check, credit, credit card, debit card, etc.

The audio system 120 provides any audible messages to the user. Such audible messages include instructions, confirmations, warnings, alerts, and alarms. The audio system 120 may activate an alarm if a user fails to pick up a payment instrument.

Figure 6:
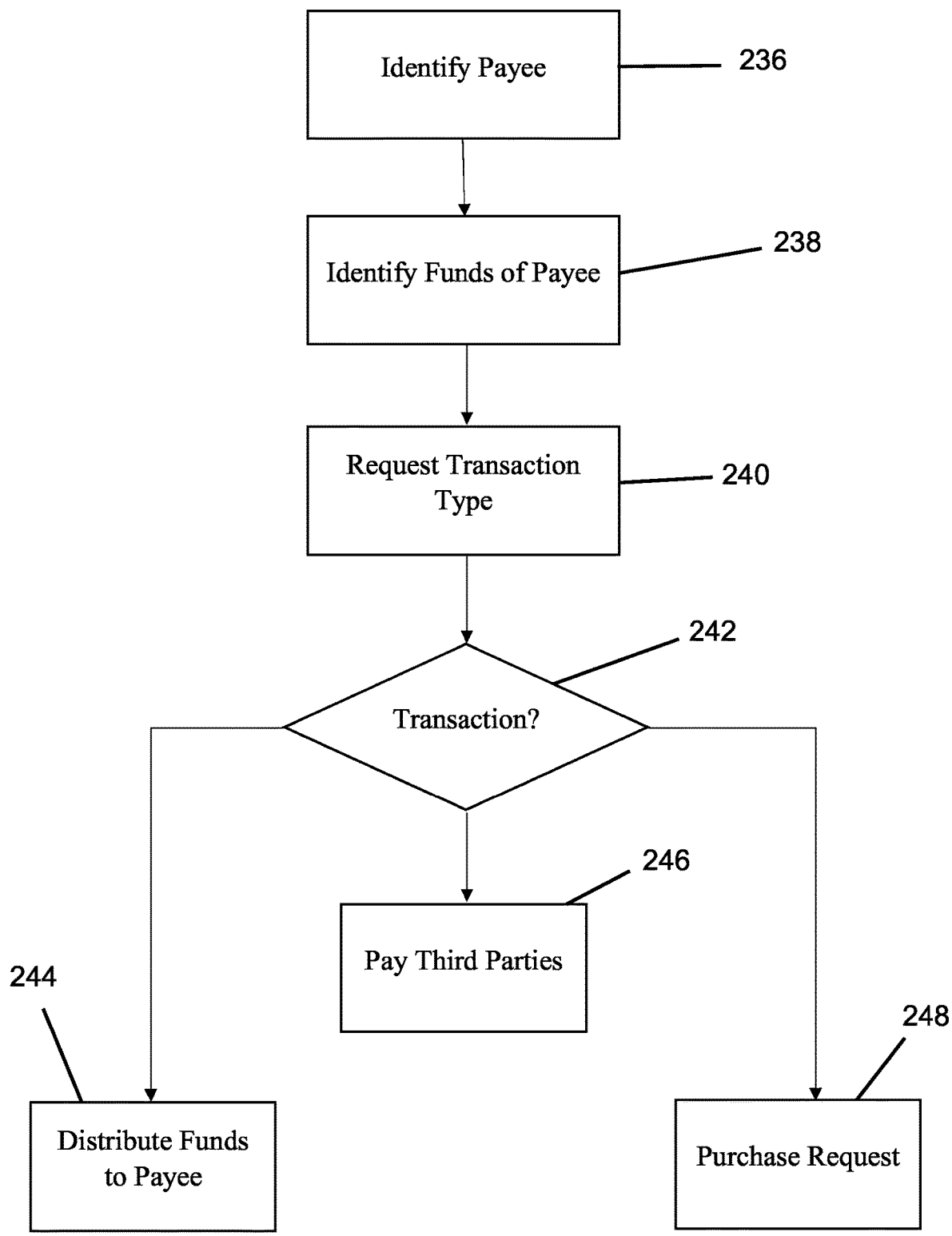
FIG. 6 is a flow chart showing a process of one embodiment of the present invention.
Figure 7:
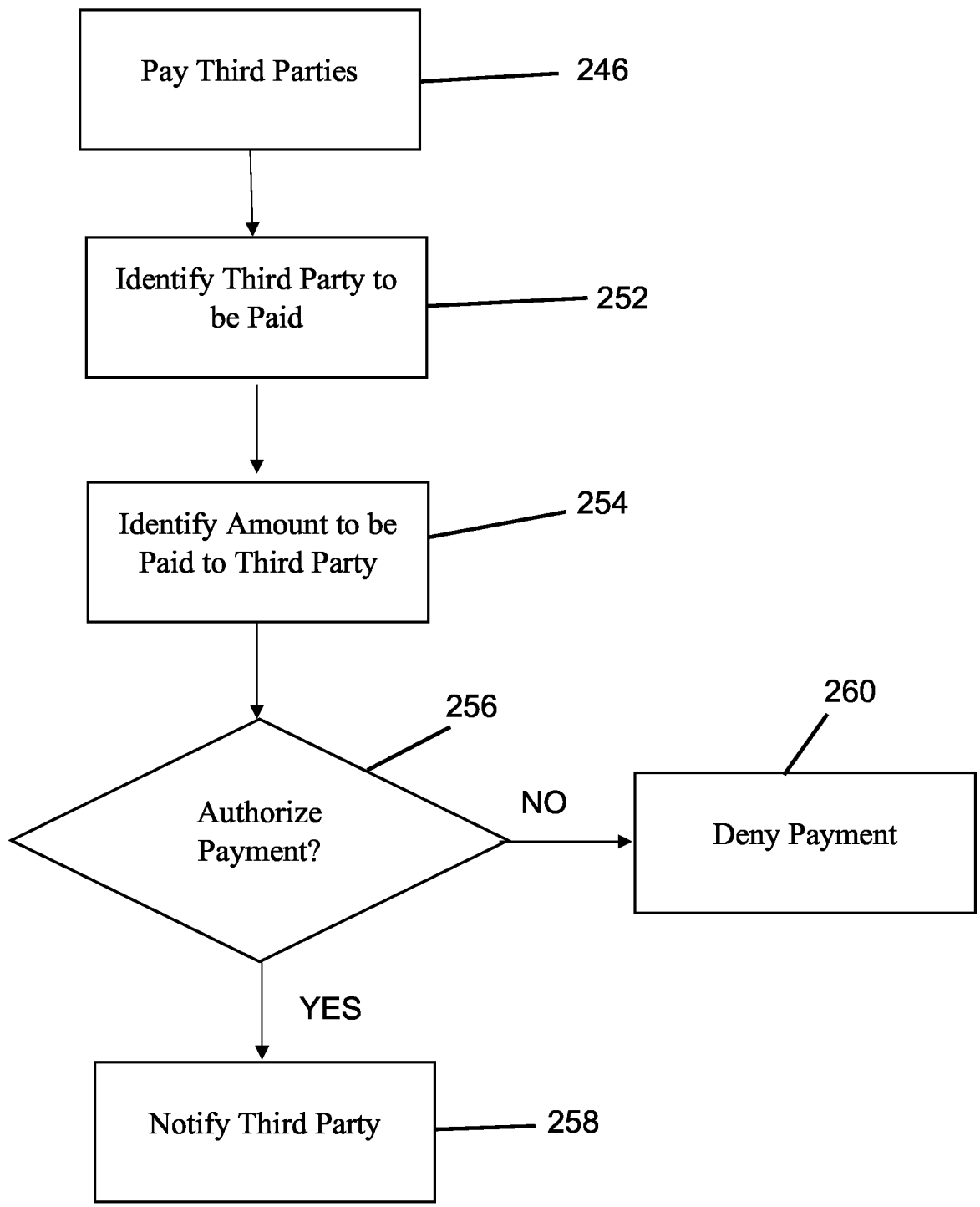
FIG. 7 is a flow chart showing a process of one embodiment of the present invention.
Figure 8:
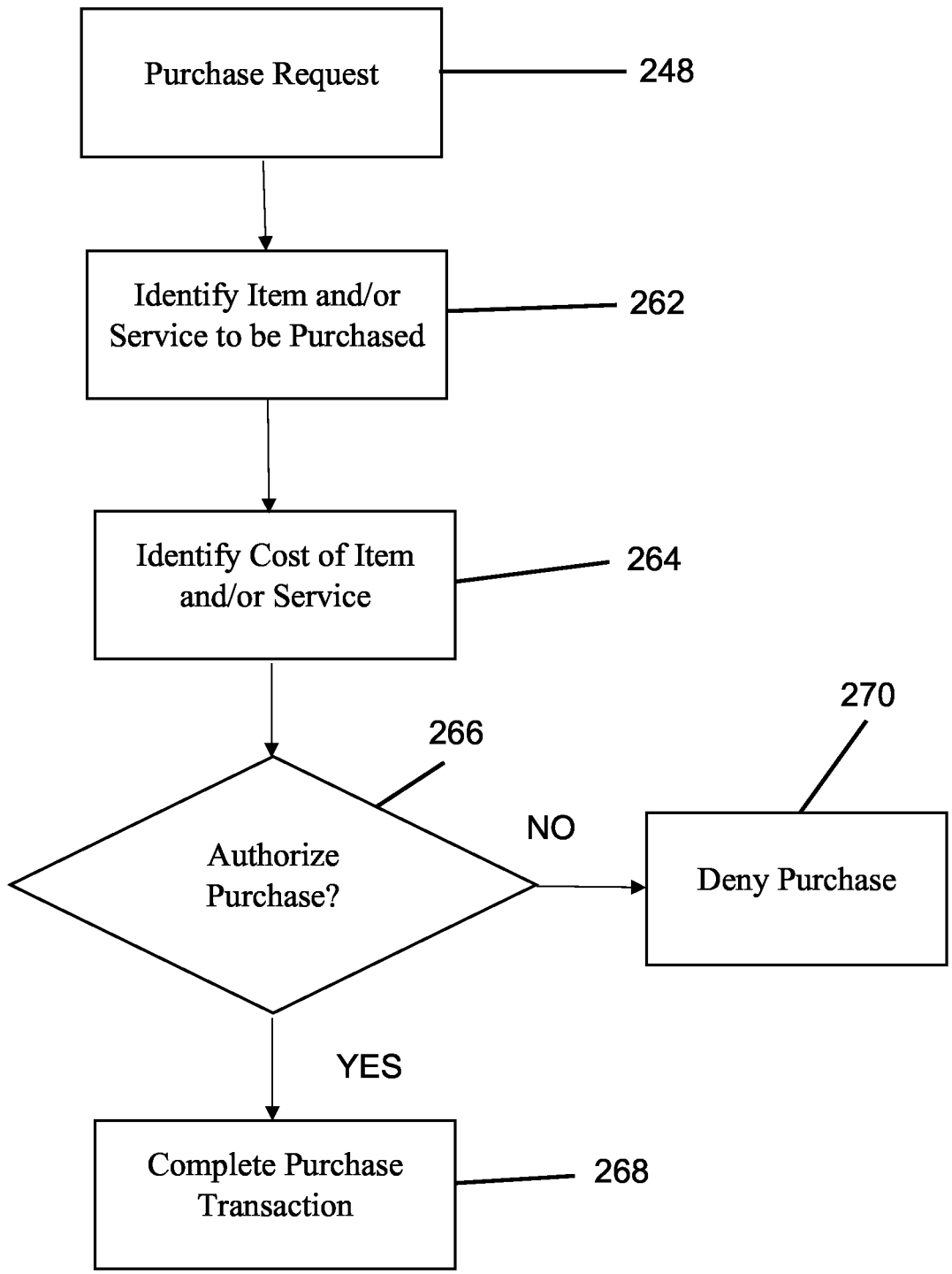
FIG. 8 is a flow chart showing a process of one embodiment of the present invention.

The system 100 provides a vending machine that distributes funds and/or other items to users. The system 100 of one embodiment also allows users to complete transactions with third parties, including vendors, institutions, facilities, businesses, friends, family, and other third parties. Such transactions are shown in FIGS. 6-8. These transactions include distributing funds to a user, such as a payee; purchasing items and/or services; transferring funds to a third party; and distributing items and/or charitable goods and/or funds to a user.

The system 100 identifies the user accessing the vending machine 102 prior to completing a transaction. Identifying the user enables the system to customize the user's experience. Identification enables the system to identify any funds and/or items available to the user. The vending machine 102 identifies the user via one of the input devices 110, including but not limited to a keyboard, keypad, biometric scanner, sensor, and/or reader, camera 114, etc.

Figure 3:
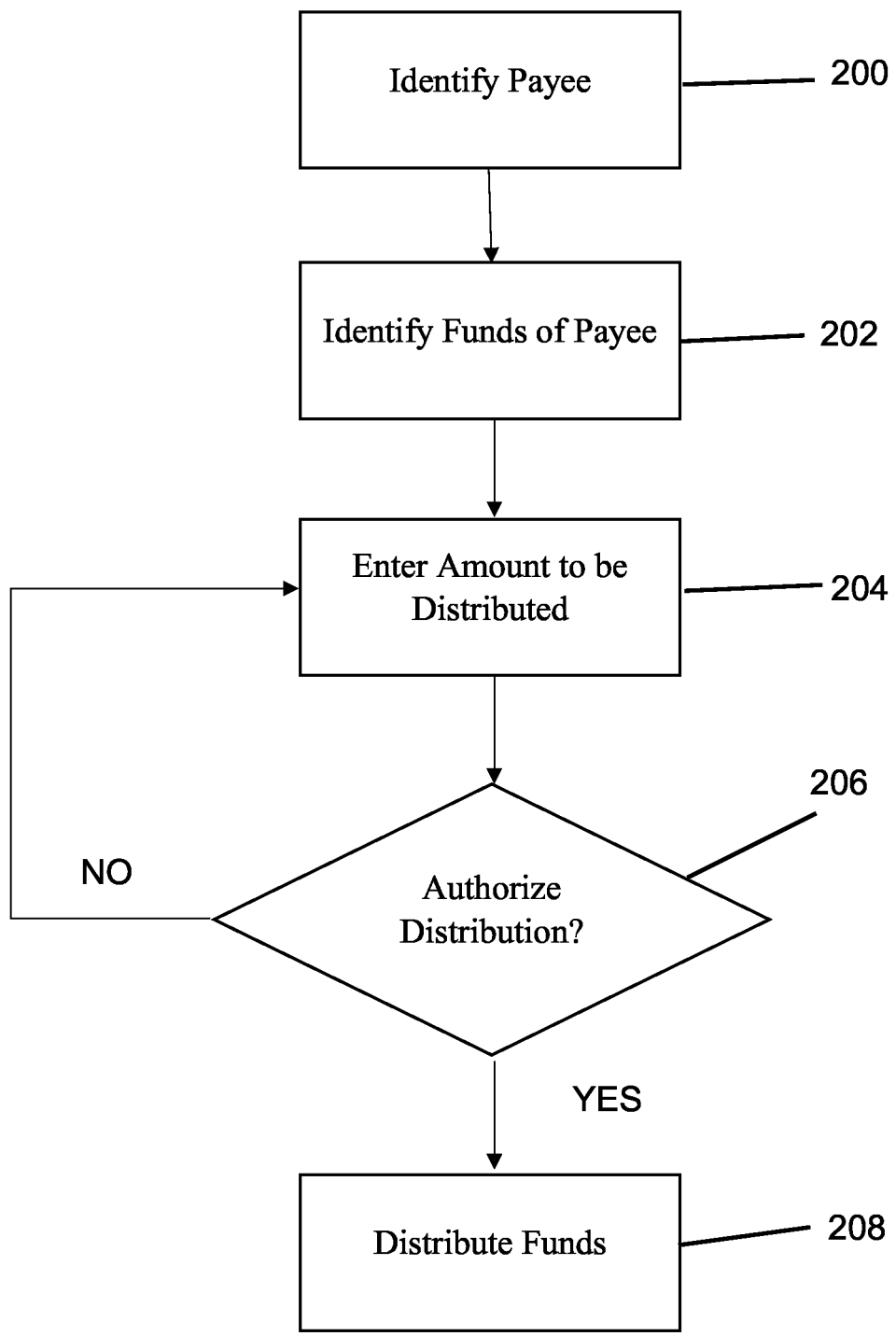
FIG. 3 is a flow chart showing a process of one embodiment of the present invention.

FIG. 3 shows the process of distributing funds to a payee. The system identifies the payee at Identify Payee Step 200. The system 100 may store verified identification data locally on the vending machine 102 or remotely via a server 104 or other storage. The system captures the captured identification data from the user. Such identification data includes, but not limited to, a login/password, biometric data, PIN, code, retinal scan, fingerprint, facial recognition, voice recognition, etc.

The system compares the captured identification data to the verified identification data. The system searches for a match of the identification data to identify the user accessing the vending machine 102. Once the user is verified, the system 100 allows the user to perform a transaction on the vending machine 102. Identifying the user allows the user to access funds, any distributions, and/or payments to the user. The user may also access the user's account information.

The system 100 identifies the funds of the user at Identify Funds of Payee step 202. The account information that identifies the user and the user's funds may be stored locally on the vending machine 102 or the server 104. The system of one embodiment displays the fund data associated with the user on the vending machine 102.

In a controlled environment facility, the user, such as an inmate, may have one or more accounts. The user may access the account to purchase items and other services. Outside parties, such as friends and family may add funds to the user's account. This account may serve as a release account, commissary account, trust account. The facility must return the funds to the user upon release. Some of these funds may be transferred to third party service providers for services that were not rendered. These third party service providers must return the funds to the user for any unused funds. The vending machine 102 dispenses a payment instrument that includes the funds of the user's account(s) and any unused money with third party service providers.

The user, such as the payee, can then enter a requested amount of funds to be distributed by the vending machine 102. The user enters the requested amount at Enter Amount to be Distributed Step 204. The system limits the user to the funds available to the user. One embodiment of the invention applies rules that limits the user to a particular amount of funds. The funds may be limited by a time period, behavior, prior transactions, market conditions, remaining incarceration amount, balance amount, etc.

The system determines the amount allowed to be distributed to the user. The system then determines if the requested amount is within the approved amount at Authorize Distribution Query 206. The system will then distribute the requested funds if the amount of funds is approved by the system. If the system 100 does not approve the requested amount, the system may inform the user of the approved amount and ask the user to request an amount within the approved range. In another embodiment, the system may distribute only the approved amount and inform the user of the approved amount that was disbursed.

Figure 4:
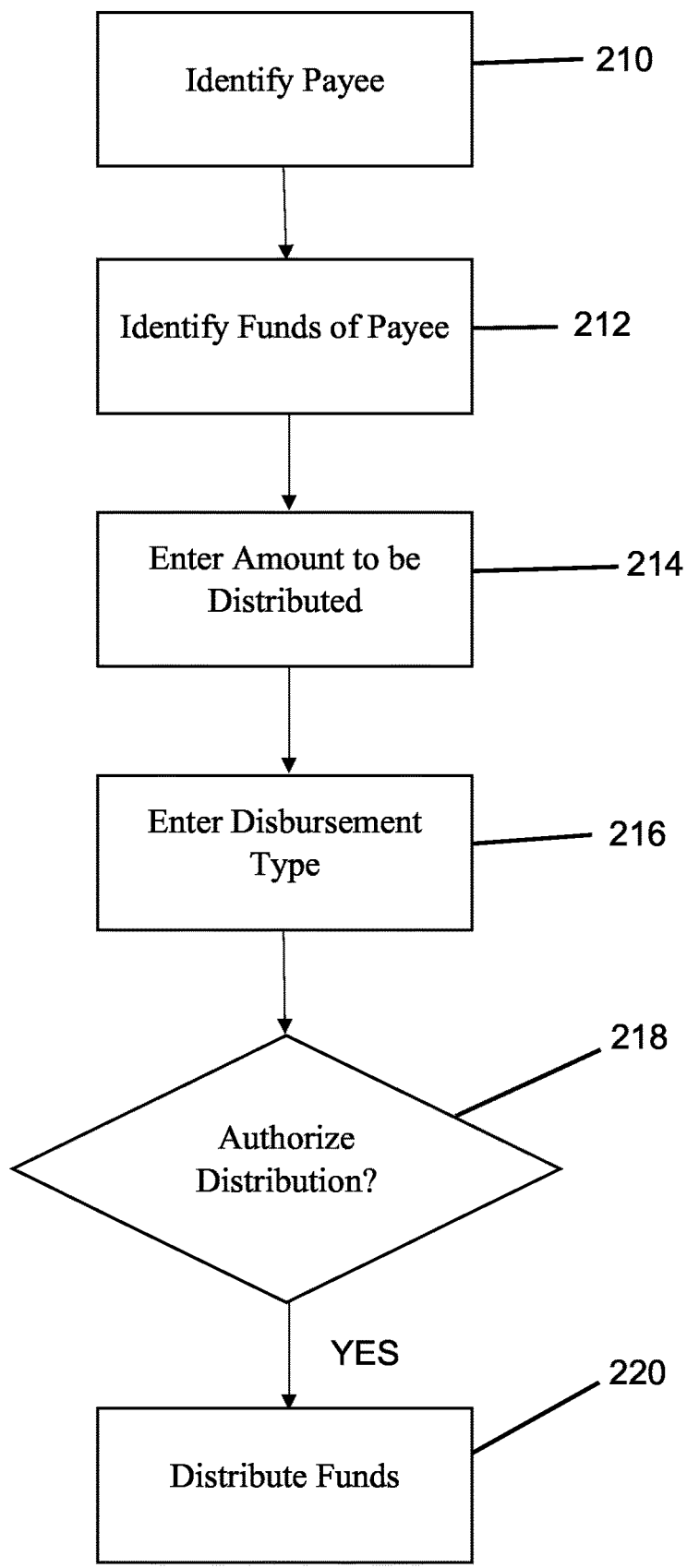
FIG. 4 is a flow chart showing a process of one embodiment of the present invention.

FIG. 4 shows another embodiment of the present invention for dispensing funds to the payee. The system identifies the payee at Identify Payee Step 210, identifies the funds of the payee at Identify Funds Step 212, and requests the amount to be distributed at Enter Amount to Distributed Step 214 as described above. The system also authorizes the distribution and distributes the funds at Authorize Distribution Query 218 and Distribute Funds Step 220.

The process shown in FIG. 4 differs from the process shown in FIG. 3 in that the payee selects the type of distribution. The system may allow the payee to select the type of payment instrument received from the vending machine as shown in FIG. 4. The user selects the payment instrument on which the funds will be applied. The user selects credit card, debit card, gift card, check, cash, or other payment instrument. The system determines if such a requested amount for the selected payment instrument is authorized by the system. The system distributes the requested amount on the requested payment instrument if the distribution is authorized. Otherwise, if the system 100 does not approve the requested amount, the system may inform the user of the approved amount for the selected payment instrument and ask the user to request an amount within the approved range. In another embodiment, the system may distribute only the approved amount and inform the user of the approved amount disbursed.

Figure 5:
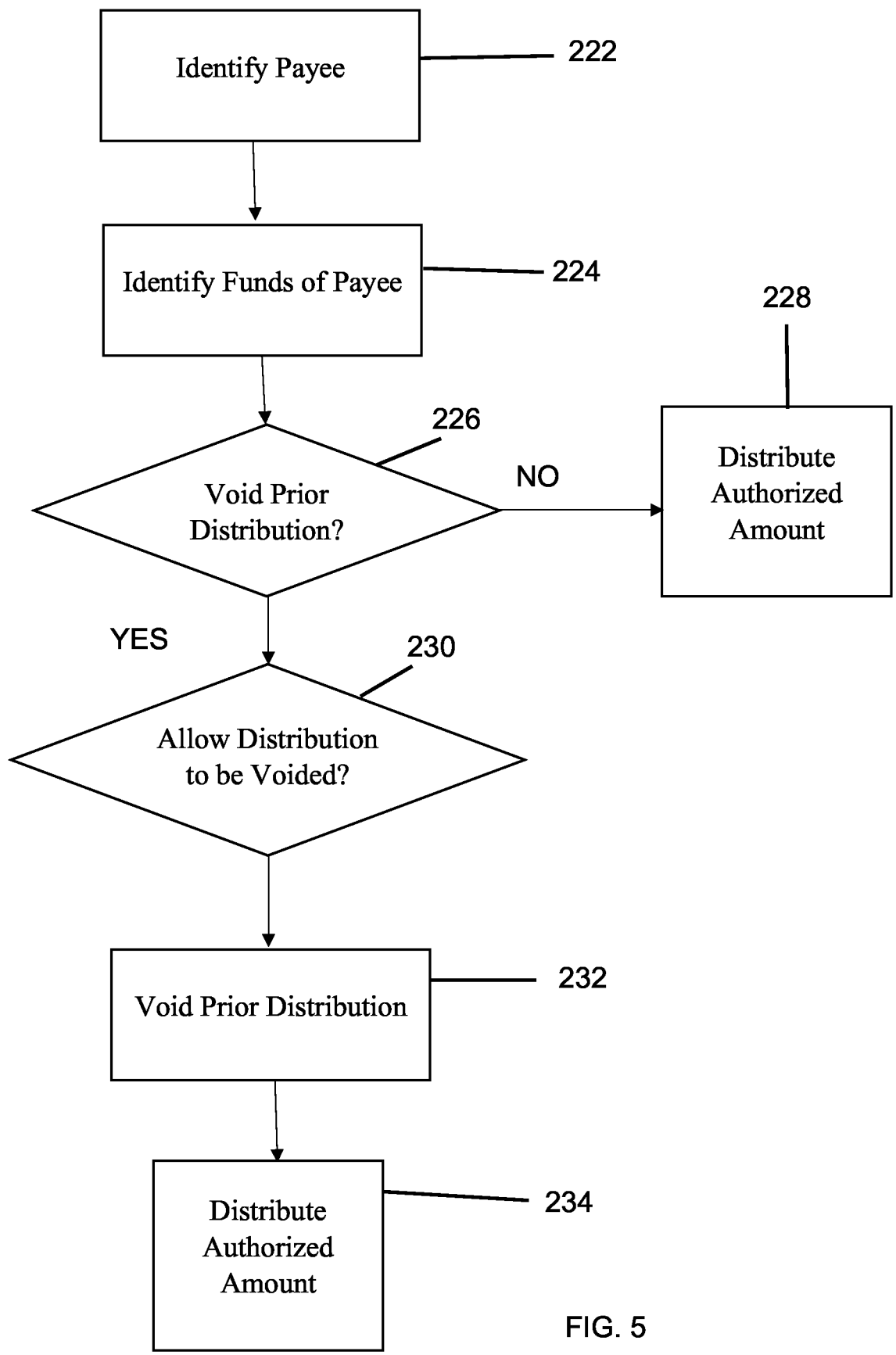
FIG. 5 is a flow chart showing a process of one embodiment of the present invention.

FIG. 5 shows an embodiment of the present invention in which the vending machine allows a user to void a prior distribution. Each distribution is associated with the payee. The system stores identification information about the payment instrument (Payment ID) and the ID of the payee. The system associates the User ID with an Instrument ID of the payment instrument distributed user with the User ID. The system can track the funds associated with the payment instrument and the funds of the payee.

The process shown in FIG. 5 must identify the payee at Identify Payee Step 222 as discussed above. The system identifies the funds of the payee at Identify Funds Step 224. When identifying the funds, the system determines if the user has any unused funds previously distributed on a payment instrument. The system determines which payment instruments, if any, continue to have funds or may have never been activated. These payments instruments that continue to have funds could potentially be voided.

The system requests if the user would like to void any prior distributions at Void Prior Distribution Query 226. The user can select to void a prior distribution or to proceed with requesting a distribution. If the user selects not to void a payment instrument, the user requests the vending machine to distribute an authorized amount at Distribute Authorized Amount Step 228 as discussed above.

The user may select to void a specific payment instrument or all payment instruments associated with the payee. The system determines if the user and the payment instruments meet the requirements for voiding the payment instrument. Such requirements may be based on the amount of funds associated with the payment instrument, the date the payment instrument was activated, the number of payment instruments voided by the user, the number of payment instruments voided by the user over a time period, the status of the user, the behavior of the user, any prior misuses of the void function by the user, etc.

The user selects the payment instruments to be voided. The system then determines if the payment instrument meets the requirements to be voided at Allow Distribution to be Voided Query 230. If the payment instrument meets the requirements to be voided, the system voids the identified payment instruments at Void Prior Distribution Step 232. The funds of the voided payment instrument are then added to the payee's funds. The user selects the usage of the funds at Distribute Authorized Amount at Distribute Step 234.

The user may then select how the funds are used. Those funds may be applied to a new or existing payment instrument. The user may use those funds to purchase goods and/or services. The user may also choose to transfer funds to a third party.

FIG. 6 shows the different types of transactions that a user, such as the payee, can enter with the vending machine 102. Allowing multiple different types of transactions increases the functionality of the vending machine 102. Such a vending machine 102 distributes funds to a payee, transfer's a payee's funds to a third party, and allows purchases of goods and/or services.

The system identifies the payee at Identify Payee step 236 as described above. The system also identifies the funds of the payee at Identify Funds step 238 as described above. The system requests the type of transaction to be performed at Request Transaction Type Step 240. The user, payee, responds by inputting the transaction type of the requested action to be performed by the vending machine.

The user may request one of many different options. One embodiment of the vending machine allows for distribution of funds, transferring funds, purchasing goods and/or services, distribution of charitable gifts, items, funds, or other charitable donations. FIG. 6 shows selecting Distributing Funds Step 244, Paying Third Parties Step 246, and Purchasing Step 248.

The system determines the transaction input by the payee at Transaction query 242. The system then proceeds with the designated transaction. The system may distribute funds at Distributing Funds Step 244, transfer funds to a third party at Paying Third Parties Step 246, or purchase goods and/or services at Purchasing Step 248. The system performs the particular transaction identified by the user in the input transaction.

The system may distribute funds as described above and shown in FIGS. 3-5. The system may also pay third parties as shown in FIG. 7. The system may also allow for purchase of goods and/or services as shown in FIG. 8.

FIG. 7 shows the transfer of funds or payments to a third party at Pay Third Parties 246. The system of one embodiment must authorize the transaction prior to transfer of the funds. Another embodiment allows the transaction as long as sufficient funds are available for the transfer.

The user identifies the third party to be paid at Identify Third Party step 252. The user provides identifying information concerning the third party. Such information could include, but is not limited to, name, address, location, vending machine location, social security number, driver's license number, a unique identifier, bank account information, etc. The user provides sufficient information for the system to identify the third party and confirm that the funds are properly transferred to the third party. The system or the user may create a password required for the third party to access the transferred funds.

The user must also identify the amount to be paid or otherwise transferred to the third party at Identify Amount Step 254. The user enters amount to be paid or otherwise transferred, not to exceed the user's balance. The user enters the amount into the vending machine via an input device.

The system then determines whether the transfer of funds should occur. One embodiment simply confirms that the user has sufficient funds for the transfer. Other embodiments of the system apply rules to determine whether the transfer should occur. Such rules are applied at Authorize Payment Query 256. If the payment is authorized, the system transfers the funds to the third party. The funds are transferred from the user's account to an account for the third party.

The system then notifies the third party that the funds are available to the third party at Notify Third Party Step 258. The notification may include the name of the user that transferred the funds, the amount of funds transferred, the date that the funds were transferred, the date that the funds will be available, the date that the funds will expire if available, the location at which the funds will be available, and instructions for receiving the funds. In one embodiment, the transferor may provide a password to the system and to the transferee for receiving the funds. The user may supply the password to the transferee, or the system may supply the password to the transferee.

The third party may then access the funds at a vending machine or kiosk. The system may also automatically transfer the funds to a third party's bank account or other system for payment.

The system may also deny the transfer at deny payment step 260. The system informs the user that the payment and/or transfer to the third party was denied. The user may then enter a different transaction. In one embodiment, the system provides the reason for denying the transfer.

FIG. 8 shows the process of purchasing good(s) and/or service(s) at Purchase Request 248. The user (purchaser) identifies the item and/or service to be purchase at Identify Item/Service Step 262. The user selects an item and/or service via the input device of the vending machine. The system identifies the purchase price of good and/or service. In one embodiment, the purchase price may be customized to the user depending on if the user is indigent, federal prisoner, state prisoner, or other need based user.

The system then determines whether the user should be allowed to purchase the goods/services at Authorize Purchase Step 266. One embodiment simply determines if the user has the available funds required to purchase the goods/services. Another embodiment applies rules to determine if the user should be allowed to purchase the goods/services. If the purchase is allowed, the system completes the purchase transaction at Complete Purchase Transaction Step 268. Otherwise, the system denies the purchase transaction at Deny Purchase Step 270.

Figure 9:
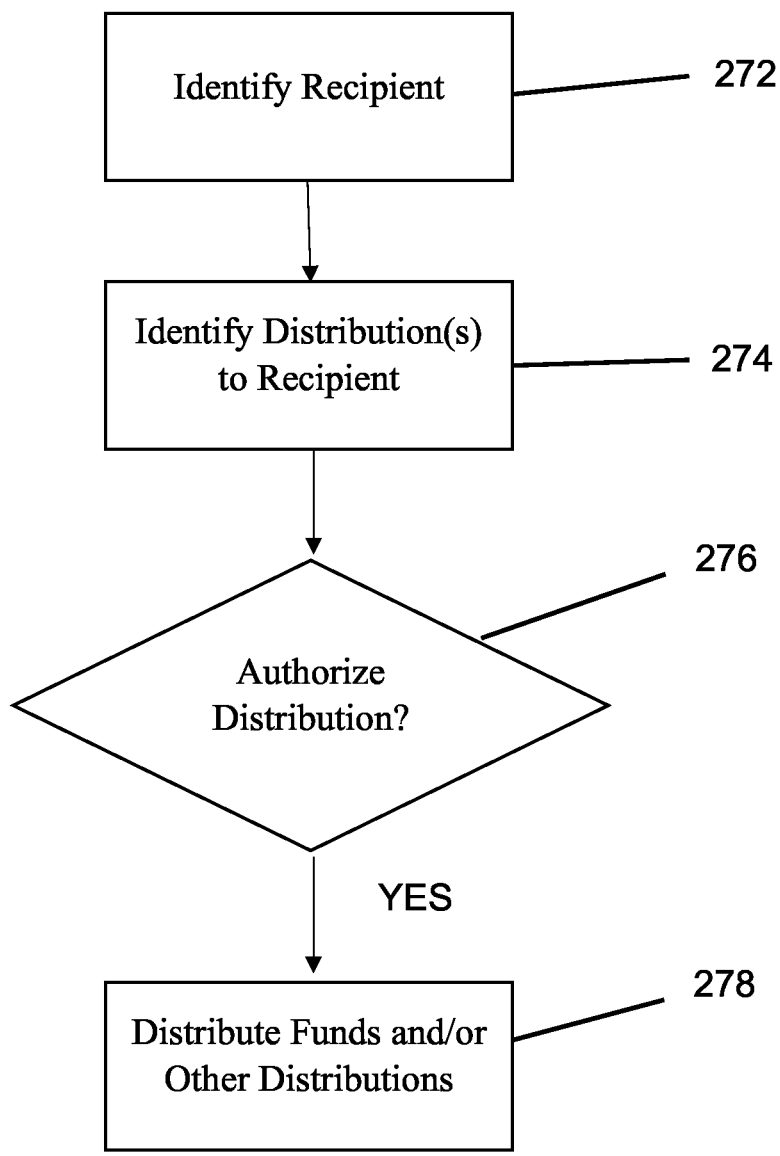
FIG. 9 is a flow chart showing a process of one embodiment of the present invention.

FIG. 9 shows an embodiment of the vending machine that distributes funds and or items to a recipient. Such recipient may be on Medicare, Medicaid, recipient from a charitable organization, indigent, or other person in need. The system verifies the recipient to confirm that the recipient qualifies for the funds and/or other distributions at Identify Recipient Step 272 as described above. The system also identifies the distribution to the recipient at Identify Distribution Step 274. Such a distribution may include money, debit cards, credit cards, gift cards, food, grocery items, personal hygiene items, etc. The system determines if the distribution is authorized at Authorize Distribution Step 276. If the distribution is authorized, the system distributes the distributed goods and/or funds at Distribution Step 278.

The system has been described as applying rules to determine if a particular distribution or transfer is allowed. The system applies rules depending upon the type of transactions. The rules may vary according to the user, the user's behavior, the status of the user (indigent, federal prisoner, state prisoner, etc.), the location of the user, etc.

The system evaluates the person's identity and historic activity to determine what options are available and the applicable rules. For example, the system may limit the number of distributions to a single inmate over a period of time. Conversely, if the inmate was previously issued a payment instrument like a debit card but never activated the instrument properly, the inmate might be given a new payment instrument.

The system may also implement a rule that limits the transaction amounts over a time period. The system may also require the inmate to receive multiple payment instruments if a single payment instrument cannot process the entire refund amount.

Another rule might require an inmate to authorize or sign other documents before receiving released funds.

The system logs all activity and transactions for alerts, tracking, and general reporting. Captured images, such as pictures or video, could be taken for future verification of identity, authenticating users, maintaining records of distributions, and creating logs of users and people who access or attempt to access the vending system. Such records may be created upon completion or denial of a transaction as shown at Distribute Funds Step 208, Distribute Funds Step 220, Notify Third Party Step 258, Deny Payment Step 260 Step, Complete Purchase Transaction Step 268, Deny Purchase Step 270, Distribute Funds and/or Other Distributions Step 278, or Denial of Distribution at Authorization Distribution Query 276.

Biometrics could also identify the user, such as the payee, the distributee, the receiving party, and the customer. The logging tracks and reports the dispensing/delivering and the refusal of dispensing/delivering an item, including, but not limited to, a dispensed item, a distributed item, a vended item, an item purchased for the user, and a payment instrument. The logged records may include the identity of the user, the item dispensed, a captured image of the user, the date and time, the location at which the item is dispensed, and the Vending Machine ID from which the item was dispensed to the user.

The system may also create an alert, including but not limited to an electronic message, an alarm, a text message, email, or other message that indicates delivery of the item or attempted access to the item. Such alerts may indicate that a particular user has accessed the machine, has been dispensed an item, or the dispensing system refuses to dispense an item to a user. Such an alert may be created upon completion or denial of a transaction as shown at Distribute Funds Step 208, Distribute Funds Step 220, Notify Third Party Step 258, Deny Payment Step 260 Step, Complete Purchase Transaction Step 268, Deny Purchase Step 270, Distribute Funds and/or Other Distributions Step 278, or Denial of Distribution at Authorization Distribution Query 276.

The system tracks the completed transactions and the denied transactions. The system of one embodiment creates records/logs of the completed transactions and/or the denied transactions, and/or accessing and attempted access to the vending machine. The system may also generate an alert upon completion or denial of a transaction and accessing or attempted access to the vending machine. Such records and alerts may identify the following information, but is not limited to, the identity of the user, the item dispensed, a captured image of the user, the date and time of dispensing the item, the date and time of accessing (attempted access) the vending machine, the date and time of capturing the image of the user, information concerning the attempted transaction (item attempted to be dispensed, user, image of the attempted user, the attempted access location, location of the vending machine), and the location at which the item is dispensed, and the Vending Machine ID. Such an alert informs administrators or other authorized personnel of the identity of the user, the location of the user, and the item to be dispensed.

In one embodiment, the system implements rules for generating alerts. Such alerts may be generated based upon identifying a selected user. Such a user may have a warrant or need to be found. Such a system transmits the alert upon identifying the selected user. The system may also create a record of the user accessing the system. Other rules may generate an alert upon denying a transaction Other rules may generate an alert upon dispensing a particular item. The system transmits the alert to the authorized personnel to inform the personnel of the transaction and the location of the user. The system may also create a record of the transaction that led to generation of the alert.

The system may also create a record and/or alert upon the rules denying a transaction. The system may also create a record and/or alert after a failed authentication of a user. In one embodiment, the computing system generates the alert after the first failed authentication. Another embodiment requires at least two failed authentications prior to generating the alert. As discussed above, the alert may be a message, such as an electronic message, transmitted to a recipient. The message includes information concerning the failed transaction/authentication. Such information may include, but is not limited to, the location, the date and time, a picture of the user/attempted user, the identity of the user, any item involved with the transaction, etc.

The rules required for distributed funds are applied at Step 206 shown in FIG. 3, Step 218 shown in FIG. 4, Distribution Steps 228, 234 of FIG. 5. Such rules may limit the amount of funds dispensed to a user to less than the user's account balance. Such rules may limit transactions to a maximum amount in situations, including but not limited to:

a) a limited amount during a single transaction;
b) a limited amount over a period of time;
c) a limited amount due to a user's behavior;
d) a limited amount based on cost of living in location;
e) a limited amount based on location;
f) a limited amount based on status in facility (state inmate, federal inmate);
g) to a limited amount based on user's financial history;
h) a limited amount based on period of time that user will be incarcerated; and
i) Other limits that may be required.

During the distribution of the payment instrument, the system may require verification that the funds were distributed. Such a system may take an image of a user to verify the release of the funds and the payment instrument. Other embodiments may require the entry of PIN or other authentication that identifies the user. The release of payment instruments may require delivery of documentation with the payment instrument. This document may provide information concerning the payment instrument and usage of the instrument. The vending machine verifies that the documentation is provided to the user. The system may require a signature that the document was provided, scanning of the document, entry of an identifier on the documentation, scanning a bar code, taking a picture of a barcode or other identifier, etc.

In one embodiment, the system and the vending machine are implemented in a controlled environment facility, such as a prison or correctional facility for use by inmates. The controlled environment facility stores verified identification data for verifying the identity of the inmates. The vending machine verifies the identity of the inmate for usage of the vending machine. In one embodiment, the system does not allow usage of the vending machine until the inmate's identity is verified by the system.

The system may operate according to the rules defined by the controlled environment facility. These rules can vary according to geographic location, the type of facility, the user, the time the user has spent in the facility, the time the user has been sentenced to the facility, etc. The controlled environment facility selects the rules to apply to the user.

The controlled environment facility may establish rules that limit the number of transactions and/or the amount of funds that can be transferred and/or distributed. Such rules may limit the number of transactions for a user, limit the number of transactions for a user during a given time period, limit the amount of funds available to a user during a single transaction, limit the amount of funds available to a user, limit the amount of funds available to a user over a given time period, limit the time periods when a user may enter a transaction.

The system may apply a rule that limits a user to a maximum number of transactions. The system may limit the user to the maximum number of transactions. The system denies any transactions that will exceed the maximum number of transactions for the user. The system may limit the user to the maximum number of transactions during a given time period. The system denies any transactions that will exceed the maximum number of transactions for the user during the given time period.

The system may also limit the distribution of the funds to the user. The system may limit the user to a maximum distribution that is less than the user's balance. The system denies the transactions that exceed the maximum distribution. The system may limit the user to a maximum distribution during a given period that is less than the user's balance. The system denies the transactions that exceed the maximum distribution during the given time period.

The system may also limit transaction(s) to particular times. The system may establish an operational time at which the vending machine will perform activities, such as the transactions, purchases, or other distributions. Outside of the operational time, the vending machine will perform no activities, such as the transactions, purchase, or other distributions. The controlled environment facility may also establish rules based upon the user. The facility may apply limits to types of users (state vs. federal), users incarcerated to a particular location, behavior of the users, the user's balance, the user's release balance, the user's debts, etc.

In some situations, the system applies different rules based on the type of user. The rules may vary the operational time, the maximum distribution amount (per transaction and during given time period), and the number of transactions (total number and amount during given time period). The rules may apply differently to state inmates compared to federal inmates. The rules may apply differently to state facilities compared to federal facilities. The rules may apply differently based upon geography, cost of living, etc.

The system may also apply the rules based upon the user's financial accounts and/or financial conditions/situation, debts, etc. The system may apply the rules based upon the user's release balance. The release balance maintains an account of the user's funds to be provided to the user at release. The system may apply a rule that only allows distributions, purchases, and/or other transfers if the user's release balance remains greater than a minimum balance, such as zero. If the release balance is less than the minimum balance or $0.00, the system may deny the transaction.

The vending machine automates the distribution of funds via a payment instrument. The system verifies the identity of the user to confirm the proper recipient of the funds. The system applies rules as described above when performing transactions, including the distribution of funds. The system also activates the payment instrument if required. The system also allows a user to void a payment instrument to recapture the funds associated with the voided instrument.

When distributing the funds via a payment instrument, the system must activate the payment instrument. The system associates the payment instrument with the inmate and activates the instrument. The system of one embodiment automatically activates the payment instrument and associates the instrument with the payee by tracking which payment instrument is vended to the inmate. In another embodiment, the system could require the inmate to call an interactive voice response system and enter information about the payment instrument and possibly identity verification information. The system may require the user to enter identifying information for the instrument via an input device, camera, etc.

In another embodiment, the system requires scanning a barcode on the payment instrument on a barcode reader on or off the vending machine for verification. Swiping the debit card through a magnetic stripe reader or entry of an identifier of the payment instrument on or off the vending machine. Such identification of the payment instrument could be done by an app on a mobile device, either with manual entry, using the camera, or other mobile device entry methods.

Based on the activation information, the system will identify the inmate and payment instrument associated with the transaction. If the inmate is allowed to perform the transaction, the payment instrument will be activated. The system allocates any funds involved in the transaction to the payment instrument. The payment instrument will then be "live" and ready for use.

One embodiment of the vending machine requires distributing documentation, such as terms and conditions, with the payment instrument. The legal documentation or other information must be delivered to the payee. The vending machine may supply an electronic or hard copy version of the documentation and/or information to the payee. The vending machine confirms that the user received the documentation. The system of one embodiment verifies receipt of the documentation by the user. The system may require a user to enter an input indicating that the user received the documentation. The system may also deliver documentation and require the user to scan or take a picture of a bar code or other identifier indicating that the user received the documentation.

The system also allows multiple different types of transactions through a vending machine. The system allows transfer of funds and purchase of goods/services. The system also serves as a distribution system for distributing food, personal hygiene items, charitable donations, WIC, or other payments to a recipient.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vending machine system for dispensing a payment instrument to a user, the system comprising:
a vending machine;
a capturing device that captures user identification data of the user of the vending machine;
a computing system that compares the captured user identification data to verified identification data, wherein matching the verified identification data with the captured user identification data identifies the user;
the computing system requiring a rule to be met prior to instructing the vending machine to dispense the payment instrument, wherein the rule is met prior to dispensing the payment instrument to the user;
the computing system generating a record after identifying the user, wherein the record indicates the identity of the user;
terms associated with the payment instrument, wherein the vending machine accepts input from the user indicating that the user accepts the terms associated with the payment instrument, wherein the vending machine receives input indicating that the user accepts the terms prior to activation of the payment instrument.

2. The system of claim 1, wherein the computing system generates the record if the rule refuses dispensing the payment instrument to the user.

3. The system of claim 1 further comprising:
the vending machine dispensing the terms;
an identifier printed on the terms, wherein the identifier is associated with the payment instrument, wherein the vending machine activates the payment instrument after receiving input that identifies the identifier.

4. The system of claim 3 further comprising:
a bar code reader that communicates with the vending machine, wherein the identifier is a bar code configured to be scanned by the bar code reader, wherein the vending machine activates the payment instrument after scanning the bar code.

5. A vending machine system for dispensing at least one item to a user, the system comprising:
a vending machine;
a capturing device secured to the vending machine that captures user identification data of the user of the vending machine;
a computing system that compares the captured user identification data to verified identification data, wherein matching the verified identification data with the captured user identification data identifies the user;
the computing system generating an alert that identifies the user of the vending machine, wherein the alert is transmitted to a remote recipient not present at the vending machine;
wherein the computing system generates the alert indicating that a selected user has been identified at the vending machine that alerts the recipient;
wherein the computing system does not generate the alert if the user identified at the vending machine is not the selected user.

6. A vending machine system for dispensing at least one item to a user, the system comprising:
a vending machine;
a capturing device that captures user identification data of the user of the vending machine;
a computing system that compares the captured user identification data to verified identification data, wherein matching the verified identification data with the captured user identification data identifies the user;
the computing system generating a record after the user accesses the vending machine;
wherein the vending machine does not dispense the item, wherein the computing system generates the record that indicates information about the user despite the vending machine not dispensing the item;
wherein the user requests the item to be dispensed, wherein the computing system generates the record if the vending machine denies dispensing the item to the user.

7. The system of claim 6, wherein the record indicates the item requested by the user.

* * * * *